US012793571B2

(12) United States Patent
Suzuki et al.

(10) Patent No.: US 12,793,571 B2
(45) Date of Patent: Nov. 10, 2026

(54) TEACHING DEVICE FOR TEACHING OPERATION OF LASER MACHINING APPARATUS, LASER MACHINING SYSTEM, AND METHOD

(71) Applicant: Fanuc Corporation, Minamitsuru-gun (JP)

(72) Inventors: Youhei Suzuki, Minamitsuru-gun (JP); Yoshinori Murakami, Minamitsuru-gun (JP)

(73) Assignee: FANUC CORPORATION, Yamanashi (JP)

(*) Notice: Subject to any disclaimer, the term of this patent is extended or adjusted under 35 U.S.C. 154(b) by 394 days.

(21) Appl. No.: 18/561,851

(22) PCT Filed: May 26, 2021

(86) PCT No.: PCT/JP2021/020059
§ 371 (c)(1),
(2) Date: Nov. 17, 2023

(87) PCT Pub. No.: WO2022/249352
PCT Pub. Date: Dec. 1, 2022

(65) Prior Publication Data
US 2024/0242623 A1 Jul. 18, 2024

(51) Int. Cl.
*G09B 19/00* (2006.01)
*B23K 26/70* (2014.01)

(52) U.S. Cl.
CPC ............ *G09B 19/00* (2013.01); *B23K 26/702* (2015.10)

(58) Field of Classification Search
CPC .. B23K 26/082; B23K 26/0884; B23K 26/21; B23K 26/705; B23K 26/046; B23K 26/38
See application file for complete search history.

(56) References Cited

U.S. PATENT DOCUMENTS

2009/0154504 A1 6/2009 Sato et al.
2011/0042360 A1* 2/2011 Takahashi .............. G02B 7/008 219/121.62
(Continued)

FOREIGN PATENT DOCUMENTS

JP 0292487 A 4/1990
JP 2001328085 A 11/2001
(Continued)

OTHER PUBLICATIONS

International Search Report and Written Opinion for International Application No. PCT/JP2021/020059, dated Jul. 20, 2021, 6 pages.

*Primary Examiner* — Mohammad Ali
*Assistant Examiner* — Dhruvkumar Patel
(74) *Attorney, Agent, or Firm* — BUCHANAN INGERSOLL & ROONEY PC

(57) ABSTRACT

A teaching device is provided with: a parameter input reception unit that receives input of a beam size indicating the size of laser light spot on a surface; a relation data acquisition unit that acquires relation data indicating a relation between a defocusing amount for shifting the focal point of the laser light from the surface in the optical axis direction of the laser light and the beam size which varies depending on the defocusing amount; a conversion unit that on the basis of the relation data, converts the beam size received by the parameter input reception unit to a corresponding defocusing amount; and a program generation unit that generates an operation program for laser machining that stipulates the defocusing amount converted by the conversion unit as a command statement.

11 Claims, 10 Drawing Sheets

(56) References Cited

U.S. PATENT DOCUMENTS

| | | | | |
|---|---|---|---|---|
| 2017/0057010 | A1* | 3/2017 | Tanoue | B23K 26/083 |
| 2019/0151988 | A1* | 5/2019 | Murakami | B23K 26/0648 |
| 2020/0070281 | A1* | 3/2020 | Takeda | B23K 26/0884 |
| 2023/0150056 | A1* | 5/2023 | Zheng | B23K 26/048 219/121.85 |

FOREIGN PATENT DOCUMENTS

| | | | |
|---|---|---|---|
| JP | 2009-142865 | A | 7/2009 |
| JP | 2017042790 | A | 3/2017 |
| JP | 2020035404 | A | 3/2020 |
| WO | 2017085763 | A1 | 5/2017 |

* cited by examiner

TEACHING DEVICE FOR TEACHING OPERATION OF LASER MACHINING APPARATUS, LASER MACHINING SYSTEM, AND METHOD

CROSS REFERENCE TO RELATED APPLICATIONS

This is the U.S. National Phase application of PCT/JP2021/020059, filed May 26, 2021, the disclosures of this application being incorporated herein by reference in its entirety for all purposes.

FIELD OF THE INVENTION

The present disclosure relates to a teaching device, a laser processing system, and a method of teaching an operation of a laser processing machine.

BACKGROUND OF THE INVENTION

A teaching device for teaching an operation of a laser processing machine is known (e.g., Patent Document 1).

PATENT LITERATURE

Patent Document 1: JP 2020-35404 A

SUMMARY OF THE INVENTION

Control (of defocusing) for shifting the focal point of a laser beam emitted from a laser processing machine from the surface of a workpiece is sometimes performed to adjust heat input to the workpiece due to the laser beam during laser processing of the laser processing machine. In the related art, there is a demand for a technique for more simply teaching an operation of a laser processing machine that performs such defocusing than ever before.

In one aspect of the present disclosure, a teaching device for teaching an operation of a laser processing machine that irradiates a surface of a workpiece with a laser beam to perform laser processing on the workpiece includes a parameter input receiving unit configured to receive an input of a beam size representing a size of an irradiation point of the laser beam on the surface, a relational data acquiring unit configured to acquire relational data representing a relationship between a defocus amount, by which a focal point of the laser beam is to be shifted from the surface in an optical axis direction of the laser beam and the beam size that changes in response to the defocus amount, a conversion unit configured to convert the beam size received by the parameter input receiving unit into the corresponding defocus amount, based on the relational data, and a program generating unit configured to generate an operation program for the laser processing in which the converted defocus amount obtained by the conversion unit is defined as a command statement.

In another aspect of the present disclosure, a method of teaching an operation of a laser processing machine that irradiates a surface of a workpiece with a laser beam to perform laser processing on the workpiece includes, by a processor, receiving an input of a beam size representing a size of an irradiation point of the laser beam on the surface, acquiring relational data representing a relationship between a defocus amount, by which a focal point of the laser beam is to be shifted from the surface in an optical axis direction of the laser beam and the beam size that changes in response to the defocus amount, converting the received beam size into the corresponding defocus amount, based on the relational data, and generating an operation program for the laser processing in which the converted defocus amount is defined as a command statement.

The present disclosure allows the operator to specify any beam size on the surface in order to adjust heat input to the workpiece during laser processing. Thus, it is possible to intuitively teach the operation of the laser processing machine for adjusting the input heat, such that it is possible to simplify work required for teaching.

DETAILED DESCRIPTION OF EMBODIMENTS OF THE INVENTION

Figure 1:
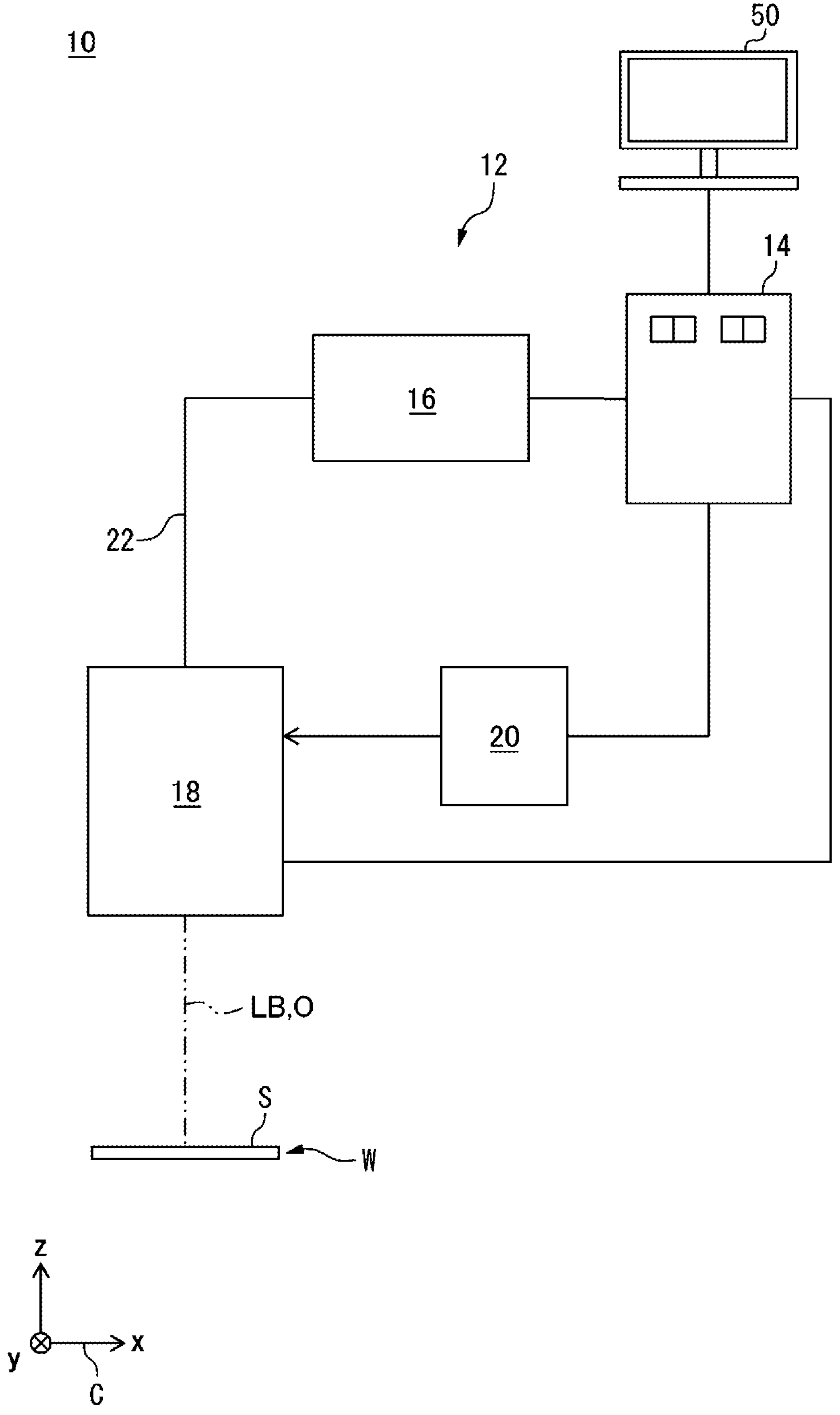
FIG. 1 is a diagram of a laser processing system according to an embodiment.

Hereinafter, embodiments of the present disclosure will be described in detail based on the drawings. In the various embodiments described below, the same reference numerals are given to the same elements and redundant description is omitted. First, a laser processing system 10 according to an embodiment will be described with reference to FIG. 1 to FIG. 3. The laser processing system 10 includes a laser processing machine 12, a control device 14, and a teaching device 50.

Under a command from the control device 14, the laser processing machine 12 irradiates a surface S of a workpiece W with a laser beam LB and performs laser processing (such as laser welding or laser cutting) on the workpiece W with the laser beam LB. Specifically, the laser processing machine 12 includes a laser oscillator 16, a laser irradiation device 18, and a moving mechanism 20.

The laser oscillator 16 is a solid-state laser oscillator (e.g., a YAG laser oscillator or a fiber laser oscillator), a gas laser oscillator (e.g., a carbon dioxide laser oscillator), or the like and internally generates a laser beam LB by optical resonance and supplies the laser beam LB to the laser irradiation device 18 through a light guide member 22 in response to a command from the control device 14. The light guide member 22 includes, for example, at least one of an optical fiber, a light guide path made of a hollow or transparent material, a reflecting mirror, and an optical lens and guides the laser beam LB to the laser irradiation device 18.

Figure 3:
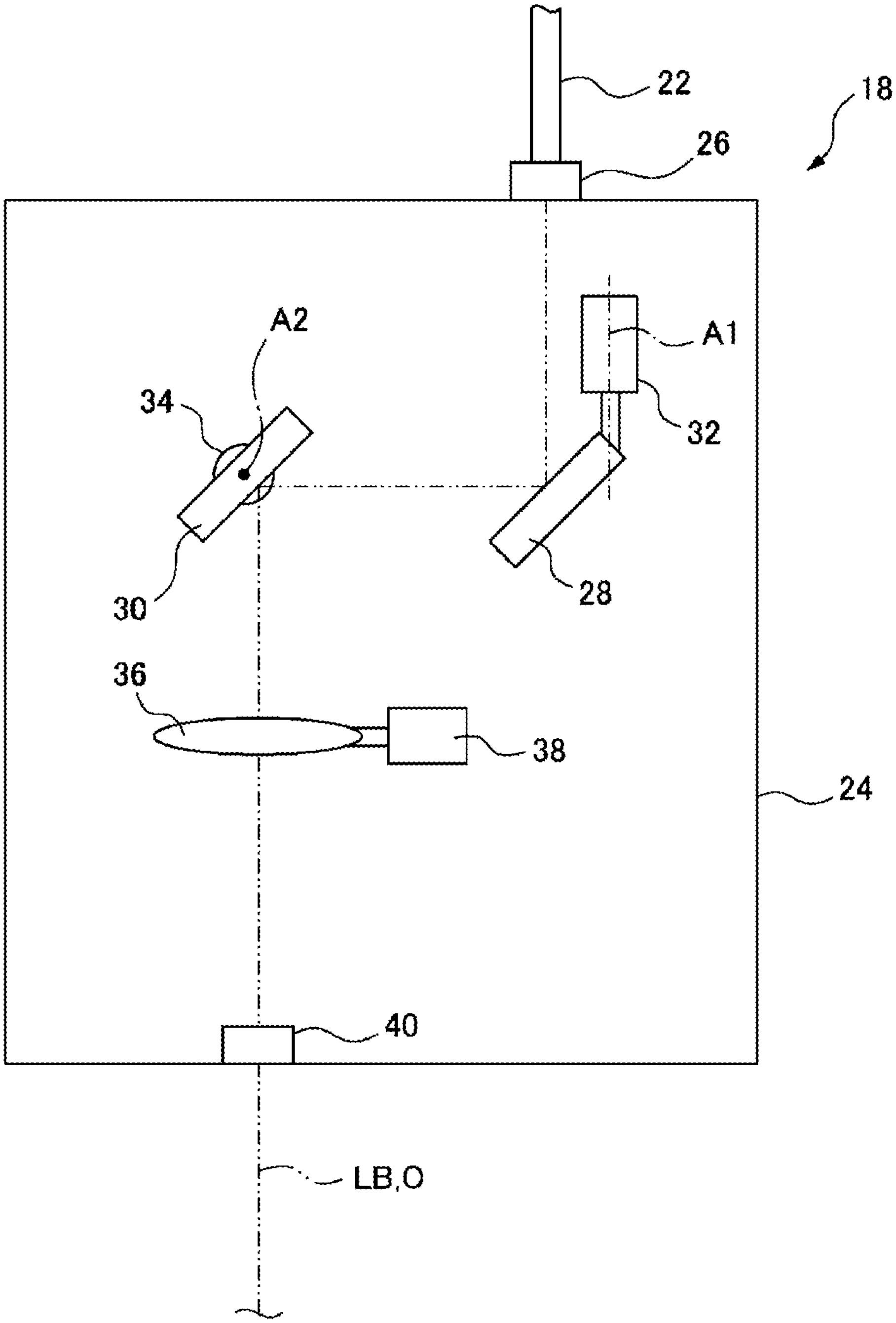
FIG. 3 illustrates an example of a laser irradiation device illustrated in FIG. 1.

The laser irradiation device 18 is a laser scanner (a galvanometer scanner), a laser processing head, or the like and focuses the laser beam LB supplied from the laser oscillator 16 and irradiates the workpiece W with the laser beam LB. FIG. 3 schematically illustrates a configuration of the laser irradiation device 18 as a laser scanner. The laser irradiation device 18 illustrated in FIG. 3 includes a housing 24, a light receiving part 26, mirrors 28 and 30, mirror driving devices 32 and 34, an optical lens 36, a lens driving device 38, and a laser beam emitting part 40.

The housing 24 is hollow and its interior defines a propagation path for the laser beam LB. The light receiving part 26 is provided at the housing 24 and receives the laser beam LB propagated through the light guide member 22. The mirror 28 is provided inside the housing 24 such that it is rotatable about an axis A1. The mirror 28 reflects the laser beam LB, which has entered the housing 24 through the light receiving part 26, toward the mirror 30. The mirror driving device 32 is, for example, a servo motor and rotates the mirror 28 about the axis A1 in response to a command from the control device 14.

On the other hand, the mirror 30 is provided inside the housing 24 such that it is rotatable about an axis A2. The axis A2 may be substantially orthogonal to the axis A1. The mirror 30 reflects the laser beam LB reflected by the mirror 28 toward the optical lens 36. The mirror driving device 34 is, for example, a servo motor and rotates the mirror 30 about the axis A2 in response to a command from the control device 14. Generally, the mirrors 28 and 30 may be referred to as galvanometer mirrors and the mirror driving devices 32 and 34 may be referred to as galvanometer motors.

The optical lens 36 includes a focus lens or the like and focuses the laser beam LB. In the present embodiment, the optical lens 36 is supported in the housing 24 such that it is movable in the direction of an optical axis O of the incident laser beam LB. The lens driving device 38 includes a piezoelectric element, an ultrasonic vibrator, an ultrasonic motor, or the like, and displaces the optical lens 36 in the direction of the optical axis O in response to a command from the control device 14, thereby displacing a focal point FP of the laser beam LB emitted to the workpiece W in the direction of the optical axis O. The laser beam emitting part 40 emits the laser beam LB focused by the optical lens 36 out of the housing 24.

Referring back to FIG. 1 and FIG. 2, the moving mechanism 20 includes, for example, a servo motor and moves the laser irradiation device 18 relative to the workpiece W. For example, the moving mechanism 20 is an articulated robot capable of moving the laser irradiation device 18 to any position in a coordinate system C. Alternatively, the moving mechanism 20 may have a plurality of ball screw mechanisms that move the laser irradiation device 18 in a z axis direction of the coordinate system C while moving it along an x-y plane of the coordinate system C.

The coordinate system C is, for example, a world coordinate system that determines the three-dimensional space of a work cell, a moving mechanism coordinate system (e.g., a robot coordinate system) for controlling the movement of the moving mechanism 20, or a workpiece coordinate system that determines the coordinates of the workpiece W and is a control coordinate system for automatically controlling the operation of the laser processing machine 12.

In the present embodiment, the laser irradiation device 18 is positioned in the coordinate system C such that the emitted laser beam LB propagates in the negative direction of the z axis of the coordinate system C during laser processing. In the following description, the positive direction of the z axis of the coordinate system C may be referred to as upward for the sake of convenience.

The control device 14 controls the operation of the laser processing machine 12. Specifically, the control device 14 is a computer including a processor (such as a CPU or a GPU) and a memory (such as a ROM or a RAM). The control device 14 controls an operation of generating a laser beam by the laser oscillator 16. The control device 14 also moves the laser irradiation device 18 with respect to the workpiece W by operating the moving mechanism 20.

The control device 14 also operates the mirror driving devices 32 and 34 of the laser irradiation device 18 to change the orientations of the mirrors 28 and 30, respectively, whereby an irradiation point IP of the laser beam LB emitted to the workpiece W can be moved with respect to the workpiece W at a high speed. The control device 14 also operates the lens driving device 38 of the laser irradiation device 18 to displace the optical lens 36, thereby moving the focal point FP of the laser beam LB emitted from the laser beam emitting part 40 in the direction of the optical axis O.

Figure 2:
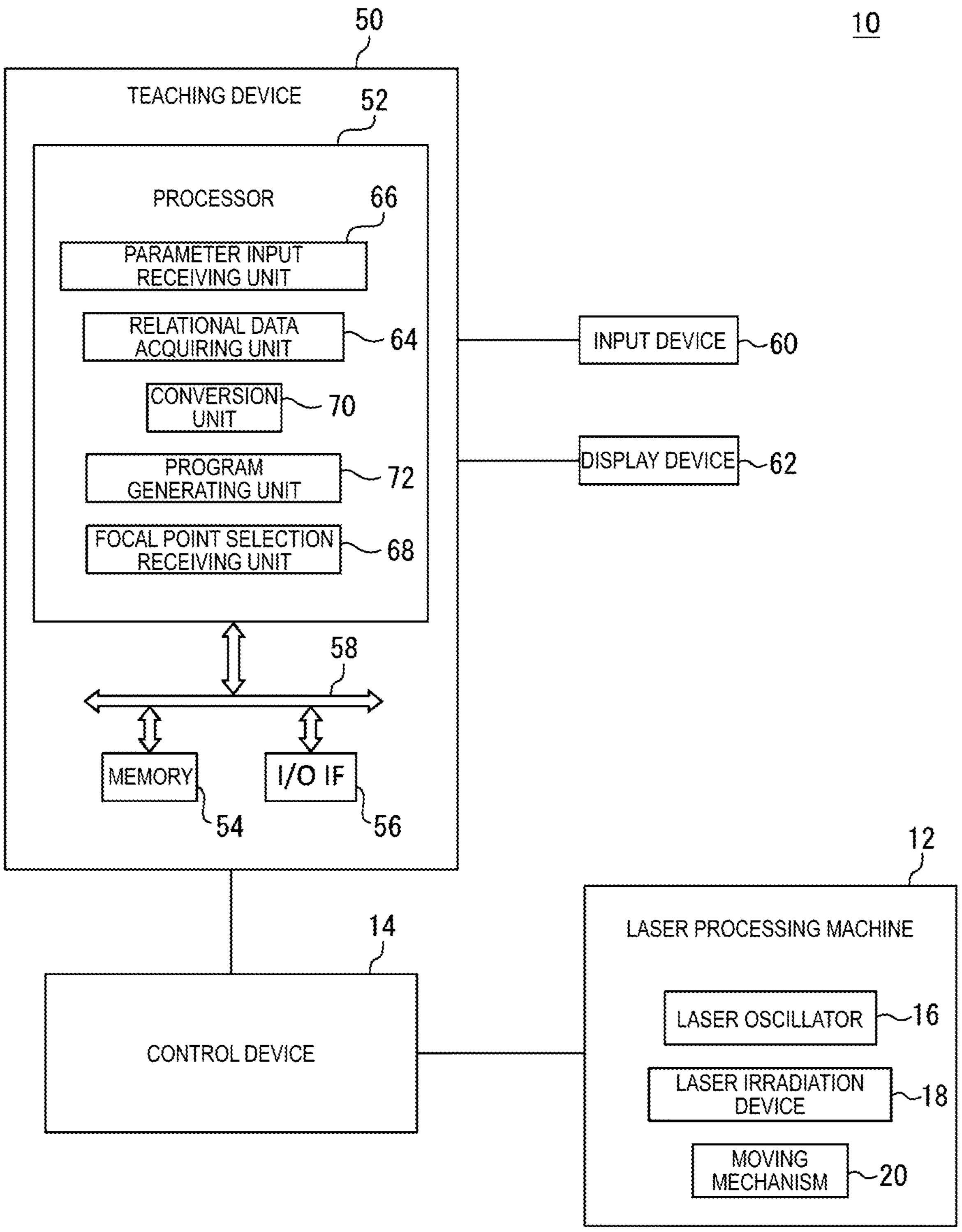
FIG. 2 is a block diagram of the laser processing system illustrated in FIG. 1.

The teaching device 50 is for teaching the operation of the laser processing machine 12. As illustrated in FIG. 2, the teaching device 50 is a computer including a processor 52, a memory 54, and an I/O interface 56. The teaching device 50 may be any type of computer such as a desktop or tablet PC or a teach pendant.

The processor 52 includes a CPU, GPU, or the like and is communicatively connected to the memory 54 and the I/O interface 56 via a bus 58. The processor 52 performs arithmetic processing for realizing teaching functions that will be described later while communicating with the memory 54 and the I/O interface 56.

The memory 54 includes a RAM, a ROM, or the like and temporarily or permanently stores various data used in arithmetic processing for teaching functions performed by the processor 52 and various data generated during the arithmetic processing. The I/O interface 56 has, for example, an Ethernet (trade name) port, a USB port, an optical fiber connector, or an HDMI (trade name) terminal and communicates data with external devices by wire or wirelessly under a command from the processor 52.

The teaching device 50 is provided with an input device 60 and a display device 62. The input device 60 includes a keyboard, a mouse, a touch panel, or the like and receives data input from an operator. The display device 62 includes a liquid crystal display, an organic EL display, or the like and displays various data.

The input device 60 and the display device 62 are communicatively connected to the I/O interface 56 by wire or wirelessly. The input device 60 and the display device 62 may be provided separately from the housing of the teaching device 50 or may be integrally incorporated into the housing of the teaching device 50.

Here, control (of defocusing) for shifting the focal point FP from the surface S in the direction of the optical axis O (i.e., in the z axis direction of the coordinate system C) is sometimes performed to adjust heat input to the workpiece W due to the laser beam LB during laser processing of the laser processing machine 12. Defocusing performed during laser processing will be described below with reference to FIG. 4 and FIG. 5.

Figure 4:
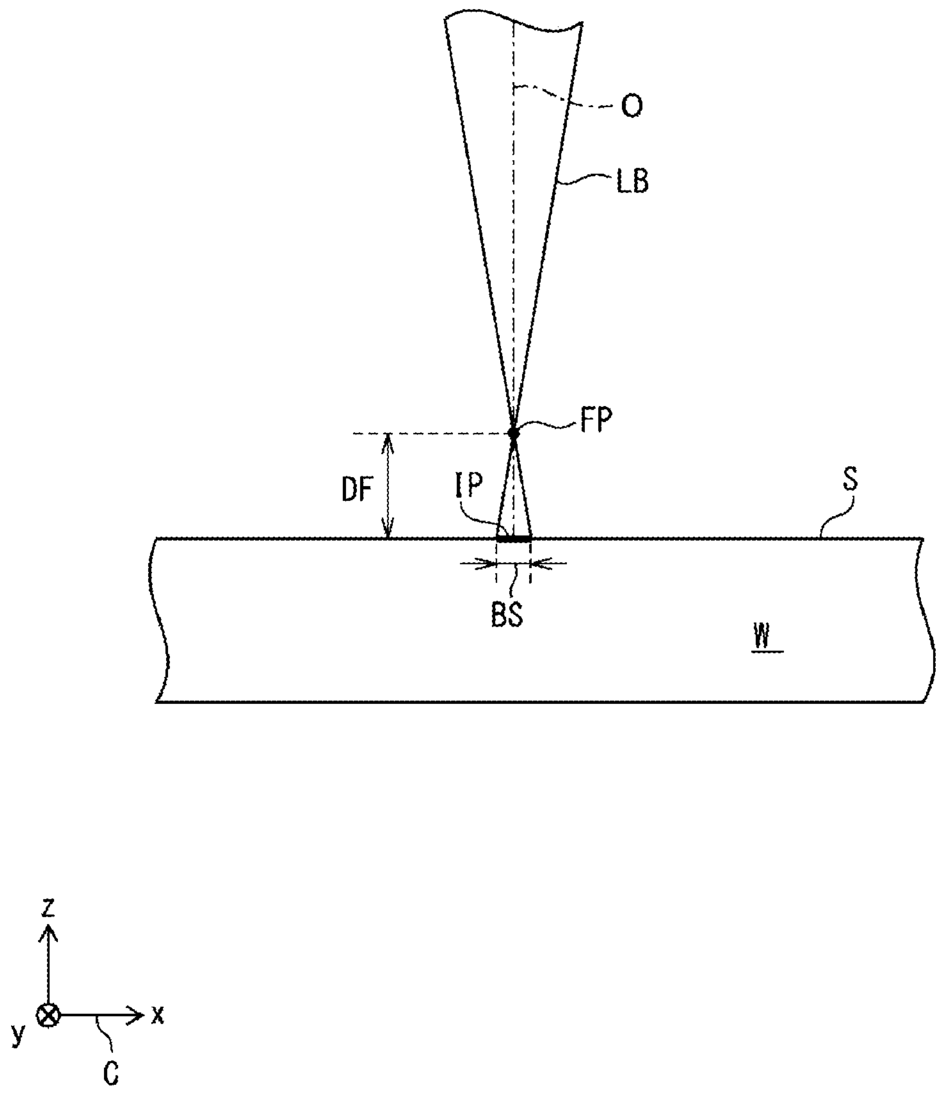
FIG. 4 is a diagram for explaining out-focus in which the focal point is shifted upward from the surface of a workpiece.

FIG. 4 illustrates a state in which the focal point FP deviates from the surface S upward (i.e., toward the laser beam emitting part 40) by a defocus amount DF. The defocus amount DF corresponds to a distance by which the focal point FP is shifted from the surface S. Herein, the size on the surface S of the irradiation point IP of the laser beam LB with which the surface S is irradiated is referred to as a beam size BS. This beam size BS can be expressed, for example, as a diameter (or radius) R (in μm) or an area E (in $\mu m^2$) of the irradiation point IP. Also, defocus with the focal point FP shifted upward from the surface S as illustrated in FIG. 4 is referred to as "out-focus".

Figure 5:
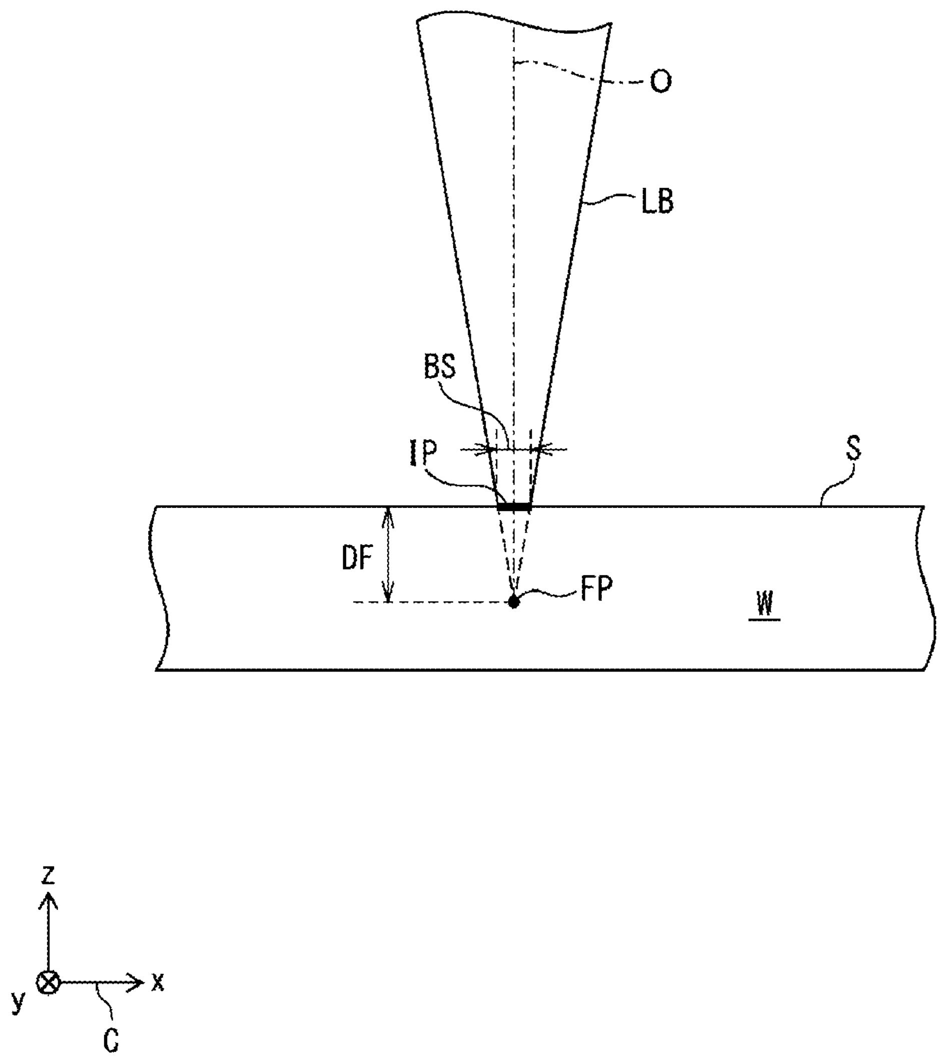
FIG. 5 is a diagram for explaining in-focus in which the focal point is shifted downward from the surface of the workpiece.

On the other hand, FIG. 5 illustrates a state in which the focal point FP is shifted downward from the surface S (i.e., away from the laser beam emitting part 40) by a defocus amount DF. Herein, defocus with the focal point FP shifted downward from the surface S as illustrated in FIG. 5 is referred to as "in-focus". The beam size BS changes in response to the defocus amount DF (i.e., the position of the focal point FP).

The teaching device 50 teaches the operation of the laser processing machine 12 that performs laser processing on the workpiece W while performing defocusing. A method of teaching the operation of the laser processing machine 12 using the teaching device 50 will be described below. Upon receiving a teaching start command from the operator through the input device 60, the processor 52 acquires relational data RD representing the relationship between the defocus amount DF and the beam size BS.

In the present embodiment, a data table DT as shown in Table 1 below is stored in the memory 54 in advance as the relational data RD.

TABLE 1

| Defocus amount [mm] | Beam size [μm] |
|---|---|
| −50 | 400 |
| −30 | 300 |
| −10 | 220 |
| 0 | 200 |
| 10 | 220 |
| 30 | 300 |
| 50 | 400 |

As described above, the beam size BS changes in response to the defocus amount DF, and between the beam size BS and the defocus amount DF, there is a relationship specific to the optical system of the laser processing machine 12 (e.g., the light guide member 22, the light receiving part 26 of the laser irradiation device 18, the mirrors 28 and 30, the optical lens 36, and the laser beam emitting part 40). In the data table DT, a plurality of defocus amounts DF and beam sizes BS are stored in association with each other.

A positive value of the defocus amount DF in Table 1 (e.g., "50") indicates a defocus amount DF of out-focus (i.e., a distance by which the focal point FP is shifted upward from the surface S), whereas a negative value of the defocus amount DF (e.g., "−50") indicates a defocus amount DF of in-focus (i.e., a distance by which the focal point FP is shifted downward from the surface S). That is, the data table DT shown in Table 1 represents the relationship between the beam sizes BS and the defocus amounts DF of out-focus and in-focus. In the data table DT shown in Table 1, diameters R of the irradiation point IP are also stored as beam sizes BS.

Figure 6:
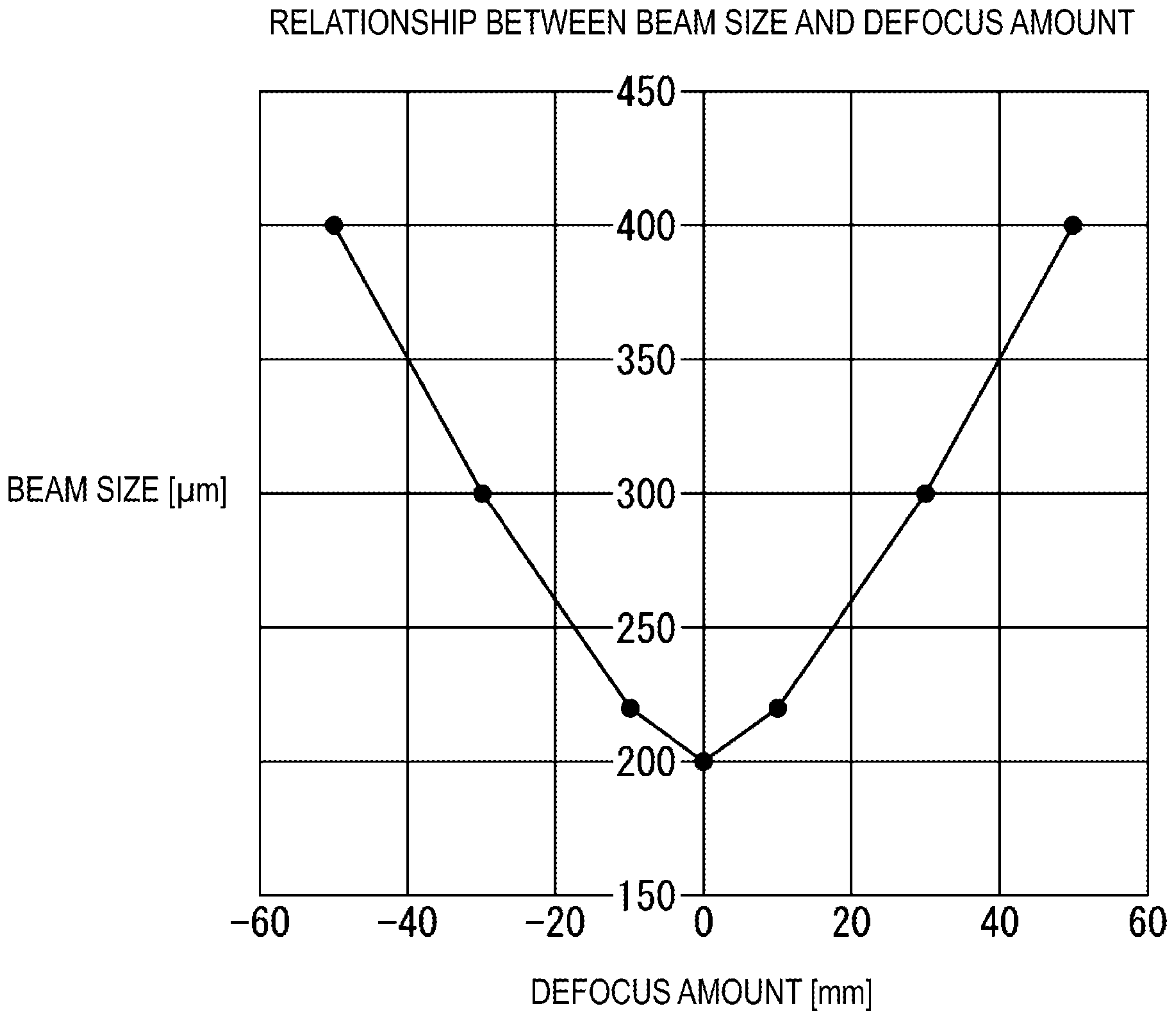
FIG. 6 is a graph indicating the relationship between defocus amounts and beam sizes (diameters).

FIG. 6 is a graph illustrates the relationship between the defocus amounts DF and the beam sizes BS (diameter R) stored in the data table DT. In the graph illustrated in FIG. 6, the beam sizes BS corresponding to the defocus amounts DF stored in the data table DT are plotted by points and linear interpolation is performed between each pair of points.

When the operator inputs an arbitrary beam size BS as will be described later, the processor 52 can convert the beam size BS into a corresponding defocus amount DF based on the data table DT. As an example, the processor 52 obtains a defocus amount DF from a beam size BS by linearly interpolating the data table DT as illustrated in FIG. 6.

Specifically, when an input of a diameter $R_x$ not stored in the data table DT is received as a beam size BS, the processor 52 obtains a defocus amount DF corresponding to the beam size BS (diameter $R_x$) using the data table DT and the following equation (1) representing linear interpolation.

$$(R_n - R_x)/(R_x - R_{n+1}) = (|DF_n| - |DF_x|)/(|DF_x| - |DF_{n+1}|) \quad (1)$$

Here, $R_n$ indicates a diameter R with a value that is larger than and closest to the input diameter $R_x$ among the diameters R stored in the data table DT. On the other hand, $R_{n+1}$ indicates a diameter R with a value that is smaller than and closest to the input diameter $R_x$ among the diameters R stored in the data table DT. $DF_n$ indicates a defocus amount corresponding to the diameter $R_n$ stored in the data table DT and $DF_{n+1}$ indicates a defocus amount corresponding to the diameter $R_{n+1}$ stored in the data table DT.

The processor 52 can obtain the absolute value (i.e., $|DF_x|$) of a defocus amount $DF_x$ corresponding to the input diameter $R_x$ from equation (1), and as a result, can obtain a defocus amount $+DF_x$ of out-focus corresponding to the diameter $R_x$ or a defocus amount $-DF_x$ of in-focus corresponding to the diameter $R_x$.

For example, when diameter $R_x$=350 μm, the data table DT gives $R_n$=400, $R_{n+1}$=300, $DF_n$=−50, and $DF_{n+1}$=−30 and thus the processor 52 can obtain $DF_x$=±40 from the data table DT and equation (1). The data table DT and equation (1) constitute relational data RD.

The processor 52 may obtain a defocus amount DF from a beam size BS by non-linearly interpolating the data table DT between points in the graph illustrated in FIG. 6. In this case, the processor 52 may obtain the defocus amount $DF_x$ corresponding to the input diameter $R_x$ using the data table DT and the equation representing nonlinear interpolation.

As another example, the processor 52 may generate a graph (or a function BS=R=f(DF)) illustrated in FIG. 6 from the data table DT. In this case, the processor 52 applies the input diameter $R_x$ to the generated graph (or function R=f (DF)) to obtain the corresponding defocus amount $DF_x$.

The data table DT and the graph (or function R=f(DF)) constitute relational data RD. That is, in this example, the processor 52 generates, from the data table DT which is one element of the relational data RD, a graph (or function) which is another element of the relational data RD.

In this way, the processor 52 acquires relational data RD (e.g., the data table DT and equation (1)). Thus, in the present embodiment, the processor 52 functions as a relational data acquiring unit 64 (FIG. 2) that acquires the relational data RD. While acquiring the relational data RD, the processor 52 generates a teaching image 100 illustrated in FIG. 7 as computer graphics (CG) image data and displays the teaching image 100 on the display device 62.

The teaching image 100 is a graphical user interface (GUI) for assisting the operator's teaching work and includes a data set input image 102, a focal point selection image 104, and a data set display image 106. The data set input image 102 is for inputting a data set DS1 of a progress parameter PP and a beam size BS.

Figure 7:
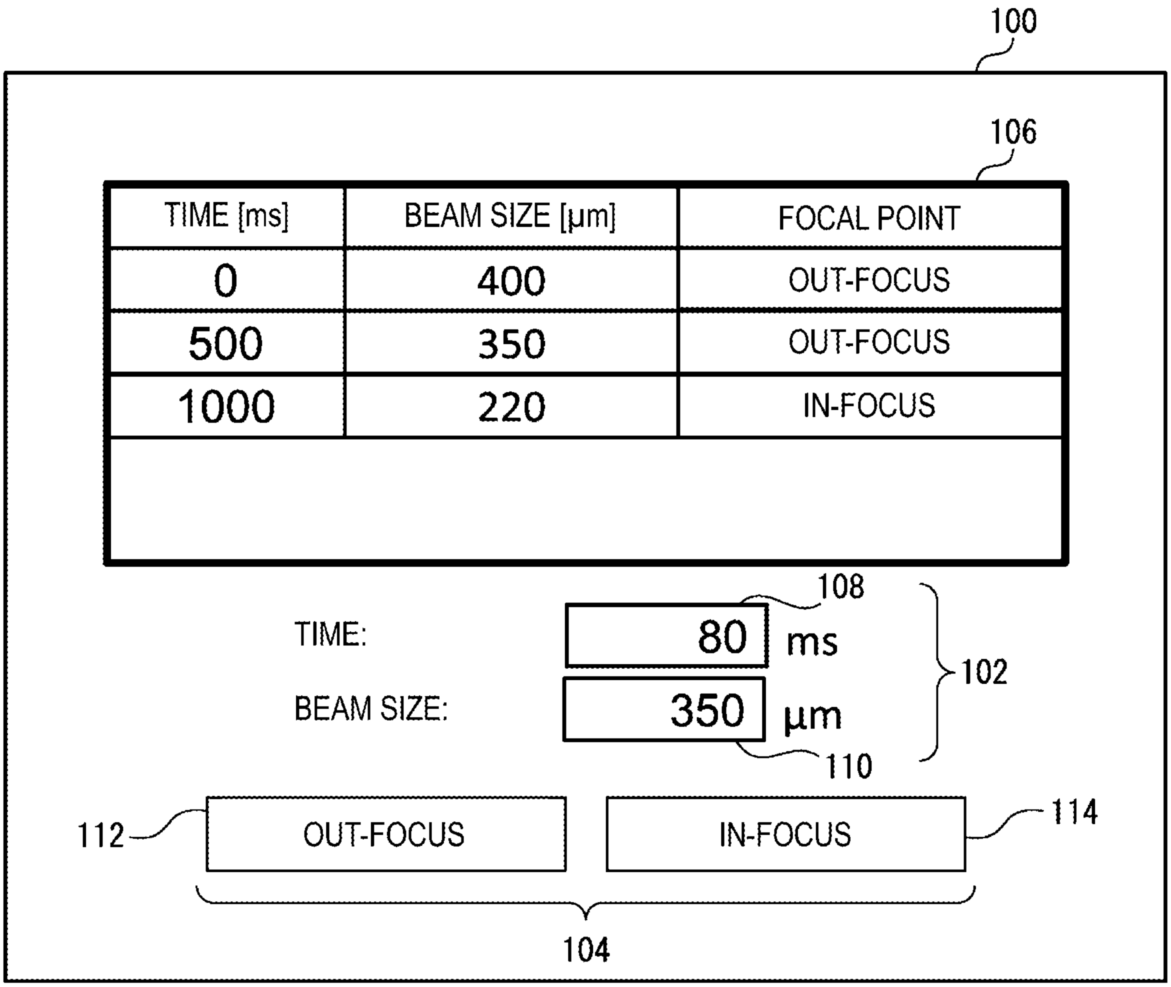
FIG. 7 illustrates an example of a teaching image.

The progress parameter PP is a parameter that quantitatively represents the progress of laser processing and includes, for example, an elapsed time $t_e$ from the start of laser processing or a distance d that the laser processing machine 12 moves the irradiation point IP with respect to the surface S from the start of laser processing. FIG. 7 illustrates an example in which the elapsed time $t_e$ (in msec) is selected as a progress parameter PP.

The data set input image 102 includes a progress parameter input image 108 into which the progress parameter PP can be input and a beam size input image 110 into which the beam size BS (diameter R or area E) can be input. The operator can operate the input device 60 to input the progress parameter PP and the beam size BS to the progress parameter input image 108 and the beam size input image 110, respectively. FIG. 7 illustrates an example in which an elapsed time of $t_e$=80 msec is input to the progress parameter input image 108 as a progress parameter PP and a diameter of R=350 μm of the irradiation point IP is input to the beam size input image 110 as a beam size BS.

The processor 52 receives, via the I/O interface 56, the data set DS1 of the progress parameter PP (the elapsed time $t_e$) and the beam size BS that the operator has input by operating the input device 60. Thus, in the present embodiment, the processor 52 functions as a parameter input receiving unit 66 (FIG. 2) that receives inputs of the progress parameter PP and the beam size BS.

The focal point selection image 104 is for selecting out-focus or in-focus and includes an out-focus button image 112 for selecting out-focus and an in-focus button image 114 for selecting in-focus. When the operator operates the input device 60 to click the out-focus button image 112 in the image, the processor 52 stores the beam size BS (specifically, the diameter R=350 μm) input to the beam size input image 110 in the memory 54 as a laser processing condition LC in association with "out-focus".

Along with the beam size BS associated with "out-focus", the processor 52 stores the progress parameter PP (the elapsed time $t_e$=80 msec in the illustrated example), which is input to the progress parameter input image 108 at this time, in the memory 54 as a laser processing condition LC.

On the other hand, when the operator operates the input device 60 to click the in-focus button image 114 in the image, the processor 52 stores the beam size BS (the diameter R=350 μm), which is input to the beam size input image 110 at this time, in the memory 54 as a laser processing condition LC in association with "in-focus". Along with the beam size BS associated with "in-focus", the processor 52 stores the progress parameter PP (the elapsed time $t_e$=80 msec in the illustrated example), which is input to the progress parameter input image 108 at this time, in the memory 54 as a laser processing condition LC.

In this way, in the present embodiment, the processor 52 receives an input for selecting out-focus or in-focus through the focal point selection image 104. Thus, the processor 52 functions as a focal point selection receiving unit 68 (FIG. 2) that receives an input for selecting out-focus or in-focus.

Then, the processor 52 displays, in the data set display image 106, data sets DS1 of the beam size BS and the progress parameter PP of "out-focus" or "in-focus" registered in the laser processing conditions LC. In the example illustrated in FIG. 7, the data set display image 106 shows a "time" column, a "beam size" column, and a "focal point" column.

Information on the elapsed times $t_e$=0 msec, $t_e$=500 msec, and $t_e$=1000 msec already registered in the laser processing conditions LC is displayed in the "time" column. The diameters R=400 μm, R=350 μm, and R=220 μm registered in the laser processing conditions LC are displayed in the "beam size" column.

"Out focus" associated with the diameters R=400 μm and R=350 μm and "in-focus" associated with the diameter R=220 μm are displayed in the "focal point" column. In this way, the data set display image 106 displays data sets DS1 of the progress parameter PP and the beam size BS and the position of the focal point (out-focus or in-focus) in list form. Thus, the operator can register data sets DS1 of the beam size BS and the progress parameter PP of "out-focus" or "in-focus" in the laser processing conditions LC through the teaching image 100.

The operator also registers a movement path MP along which the irradiation point IP is to be moved on the surface S during laser processing, a movement speed V at which the irradiation point IP is to be moved, a laser power PW of the laser beam LB to be output, and a pulse frequency f, and the like as laser processing conditions LC. The processor 52 may generate a teaching image (not illustrated) for inputting the parameters such as the movement path MP, the movement speed V at which the irradiation point IP is to be moved, the laser power PW of the laser beam LB to be output, and the pulse frequency f and receive inputs of these parameters through the teaching image.

After registering the desired laser processing conditions LC, the operator operates the input device 60 to issue an operation program generation command to the processor 52. For example, the processor 52 may generate and display an operation program generation button image (not illustrated) on the display device 62. When the operator operates the input device 60 to click an operation program generation button image in the image, the input device 60 may transmit an operation program generation command to the processor 52.

The processor 52 generates an operation program OP for laser processing upon receiving the operation program generation command. Specifically, the processor 52 converts each beam size BS (specifically, each diameter R) registered in the processing conditions LC to a corresponding defocus amount DF based on the relational data RD using the method described above.

For example, when a data set DS1 of an elapsed time of $t_e$=500 msec and a diameter of R=350 μm associated with "out-focus" shown in the data set display image 106 of FIG. 7 is registered in the processing conditions LC, the processor 52 converts the diameter R=350 at the elapsed time $t_e$=500 msec to a defocus amount of DF=+40 of the out-focus, for example, using the data table DT and equation (1).

On the other hand, when a data set DS1 of an elapsed time of $t_e$=1000 msec and a diameter of R=220 μm associated with "in-focus" shown in the data set display image 106 of FIG. 7 is registered in the processing conditions LC, the processor 52 converts the diameter R=220 at the elapsed time $t_e$=1000 msec to a defocus amount of DF=−10 of in-focus, for example, using the data table DT of Table 1.

In this way, the processor 52 converts beam sizes BS (diameters R) registered in the processing conditions LC into corresponding defocus amounts DF based on the relational data RD. Thus, the processor 52 functions as a conversion unit 70 (FIG. 2) that converts a beam size BS into a defocus amount DF.

While converting a beam size BS to a defocus amount DF, the processor 52 acquires the position $P_{IP}$ of the irradiation point IP on the surface S corresponding to the progress parameter PP. This position $P_{IP}$ indicates a target position on the surface S where the irradiation point IP is to be positioned at the progress parameter PP (e.g., the elapsed time $t_e$) and is represented, for example, by coordinates (x, y) on the x-y plane of the coordinate system C.

Specifically, a position $P_{IP}$ corresponding to the elapsed time $t_e$=500 as a progress parameter PP is a target position on the surface S at which the irradiation point IP is to be positioned at the time of elapsed time $t_e$=500. Here, a progress parameter PP (e.g., elapsed time $t_e$) and a position $P_{IP}$ corresponding to the progress parameter PP are associated with each other and the processor 52 can acquire the corresponding position $P_{IP}$ from the progress parameter PP. Then, the processor 52 specifies the acquired position $P_{IP}$ and the converted defocus amount DF corresponding to the position $P_{IP}$ via the progress parameter PP (the elapsed time $t_e$) in the operation program OP as a command statement CM.

For example, when the converted defocus amount DF is +40 mm at the elapsed time $t_e$=500 msec, the processor 52 writes a position $P_{IP\_500}$ (coordinates of the coordinate system C) at the elapsed time $t_e$=500 msec and the defocus amount DF=+40 mm to the operation program OP as a command statement $CM_{500}$. This command statement $CM_{500}$ is to cause the laser processing machine 12 to perform an operation of shifting the focal point FP from the surface S by a defocus amount of DF=+40 (i.e., upward by a distance of 40 mm) when the irradiation point IP reaches the position $P_{IP\_500}$ at the elapsed time $t_e$=500 msec.

The processor 52 also specifies the movement path MP, the movement speed V, the laser power PW, the pulse frequency f, and the like registered as laser processing conditions LC in the operation program OP as a command statement. In this way, the processor 52 generates an operation program OP in which the processing conditions LC such as the position $P_{IP}$, the converted defocus amount DF, the movement path MP, the movement speed V, the laser power PW, and the pulse frequency f are defined as a command statement and stores the generated operation program OP in the memory 54. Thus, the processor 52 functions as a program generating unit 72 (FIG. 2) that generates the operation program OP.

When performing laser processing, the processor 52 transmits the generated operation program OP to the control device 14. The control device 14 operates the laser processing machine 12 in accordance with the operation program OP generated by the teaching device 50 to perform laser processing. Specifically, the processor of the control device 14 generates a command to the servo motor of the moving mechanism 20 in accordance with the operation program OP and causes the laser irradiation device 18 to move to a predetermined work position with respect to the workpiece W by operating the moving mechanism 20.

The processor of the control device 14 also generates a command to the laser oscillator 16 in accordance with the operation program OP and generates and supplies a laser beam LB with the laser power PW and the pulse frequency f determined in the operation program OP to the laser irradiation device 18. In addition, the processor of the control device 14 generates commands to the mirror driving devices 32 and 34 of the laser irradiation device 18 in accordance with the operation program OP and moves the irradiation point IP of the laser beam LB emitted on the surface S at the movement speed V along the movement path MP such that it is positioned at the position $P_{IP}$ determined in the operation program OP with respect to the surface S.

Also, the processor of the control device 14 generates a command to the lens driving device 38 of the laser irradiation device 18 in accordance with the operation program OP and controls the lens driving device 38 such that the focal point FP is shifted from the surface S upward (out-focus) or downward (in-focus) by the defocus amount DF at the position $P_{IP}$ determined in the operation program OP.

For example, when the data sets DS1 shown in the data set display image 106 in FIG. 7 are determined in the operation program OP as processing conditions LC, the processor of the control device 14 shifts the focal point FP from the surface S by the defocus amount DF=+50 (see Table 1) at the elapsed time $t_e$=0 msec (i.e., at the start of laser processing), such that the beam size BS of the irradiation point IP on the surface S is controlled to R=400 μm.

Then, the processor of the control device 14 shifts the focal point FP from the surface S by the defocus amount DF=+40 as described above at the elapsed time $t_e$=500 msec, such that the beam size BS is controlled to R=350 μm. At this time, the processor of the control device 14 may control the lens driving device 38 such that the defocus amount DF gradually changes from +50 to +40 over a period of elapsed time $t_e$ from 0 to 500 msec. A command statement for gradually changing the defocus amount DF over time may also be determined in the operation program OP. In this way, the control device 14 operates the laser processing machine 12 in accordance with the operation program OP to perform laser processing on the workpiece W.

In the teaching device 50 according to the present embodiment, the parameter input receiving unit 66 receives an input of a beam size BS, the relational data acquiring unit 64 acquires relational data RD, the conversion unit 70 converts the received beam size BS into a corresponding defocus amount DF based on the relational data RD, and the program generating unit 72 generates an operation program OP in which the converted defocus amount DF is defined as a command statement CM as described above.

The teaching device 50 allows the operator to specify any beam size BS on the surface S in order to adjust heat input to the workpiece W during laser processing. Thus, it is possible to intuitively teach the operation of the laser processing machine 12 for adjusting the input heat, such that it is possible to simplify work required for teaching.

In the teaching device 50, the focal point selection receiving unit 68 receives an input for selecting out-focus or in-focus, the relational data RD includes data (e.g., the data table DT of Table 1) representing the relationship between the beam size BS and the defocus amount DF of out-focus and in-focus, and the conversion unit 70 converts the received beam size BS into a defocus amount DF of out-focus or in-focus received by the focal point selection receiving unit 68. According to this configuration, the operator can arbitrarily select whether to shift the focal point FP as out-focus or as in-focus in order to control the beam size BS. Thus, it is possible to teach the operation of the laser processing machine 12 in detail.

In the teaching device 50, the parameter input receiving unit 66 receives an input of a data set DS1 of the progress parameter PP (e.g., the elapsed time $t_e$) and the beam size BS and the program generating unit 72 generates an operation program OP that includes a command statement CM for shifting the focal point FP by the converted defocus amount DF when the irradiation point IP reaches the position $P_{IP}$ on the surface S corresponding to the progress parameter PP. This configuration allows the operator to specify any position at which defocusing for adjusting heat input to the workpiece W is to be performed, thereby teaching the operation of the laser processing machine 12 in detail.

For example, the data table DT described above may be created manually by an operator or may be acquired using an actual laser processing machine 12. Specifically, the laser processing system 10 may further include an optical sensor (not illustrated) arranged on a workpiece table (not illustrated) on which the workpiece W is installed.

Then, the control device 14 operates the laser processing machine 12 to irradiate the optical sensor with the laser beam LB and the optical sensor detects the beam size BS of the irradiated laser beam LB. Then, the control device 14 operates the lens driving device 38 to shift the focal point FP of the laser beam LB in the direction of the optical axis O by the defocus amount DF.

The optical sensor detects the beam size BS while the defocus amount DF changes. The control device 14 can automatically acquire the data table DT as shown in Table 1 based on a command value of the defocus amount DF and detection data acquired from the optical sensor. The processor 52 of the teaching device 50 can also automatically acquire the data table DT by operating the laser processing machine 12 via the control device 14.

A plurality of data tables $DT_n$(where n=1, 2, 3, . . . ) may also be stored in the memory 54 in advance. The relationship between the beam size BS and the defocus amount DF changes depending on the optical system of the laser processing machine 12 (i.e., the type of the laser processing machine 12) as described above. For example, identification information ID (such as a product number) that identifies each type of the laser processing machine 12 and a data table $DT_n$ may be associated with each other and stored in the memory 54.

This identification information ID may identify the type of the laser irradiation device 18 or a combination of optical systems (at least two of the light guide member 22, the light receiving part 26 of the laser irradiation device 18, the mirrors 28 and 30, the optical lens 36, and the laser beam emitting part 40) of the laser processing machine 12.

When the laser processing system 10 is constructed by connecting the laser processing machine 12, the control device 14, and the teaching device 50 to each other, the processor 52 may automatically acquire identification information ID from the laser processing machine 12 (e.g., from the laser irradiation device 18) via the control device 14. Then, the processor 52 may function as the relational data acquiring unit 64 and select a data table $DT_n$ associated with the acquired identification information ID from among the plurality of data tables $DT_n$ stored in the memory 54. According to this configuration, the processor 52 can automatically acquire a data table $DT_n$ corresponding to the type of the laser processing machine 12.

Alternatively, the processor 52 may generate a relational data selection image for selecting a plurality of data tables $DT_n$ stored in the memory 54 and cause the display device 62 to display the relational data selection image. Then, the operator may operate the input device 60 to select a desired one of the plurality of data tables $DT_n$ displayed in the relational data selection image. According to this configuration, the operator can arbitrarily select a data table $DT_n$ suitable for the laser processing machine 12 (e.g., the laser irradiation device 18) to be used.

Figure 8:
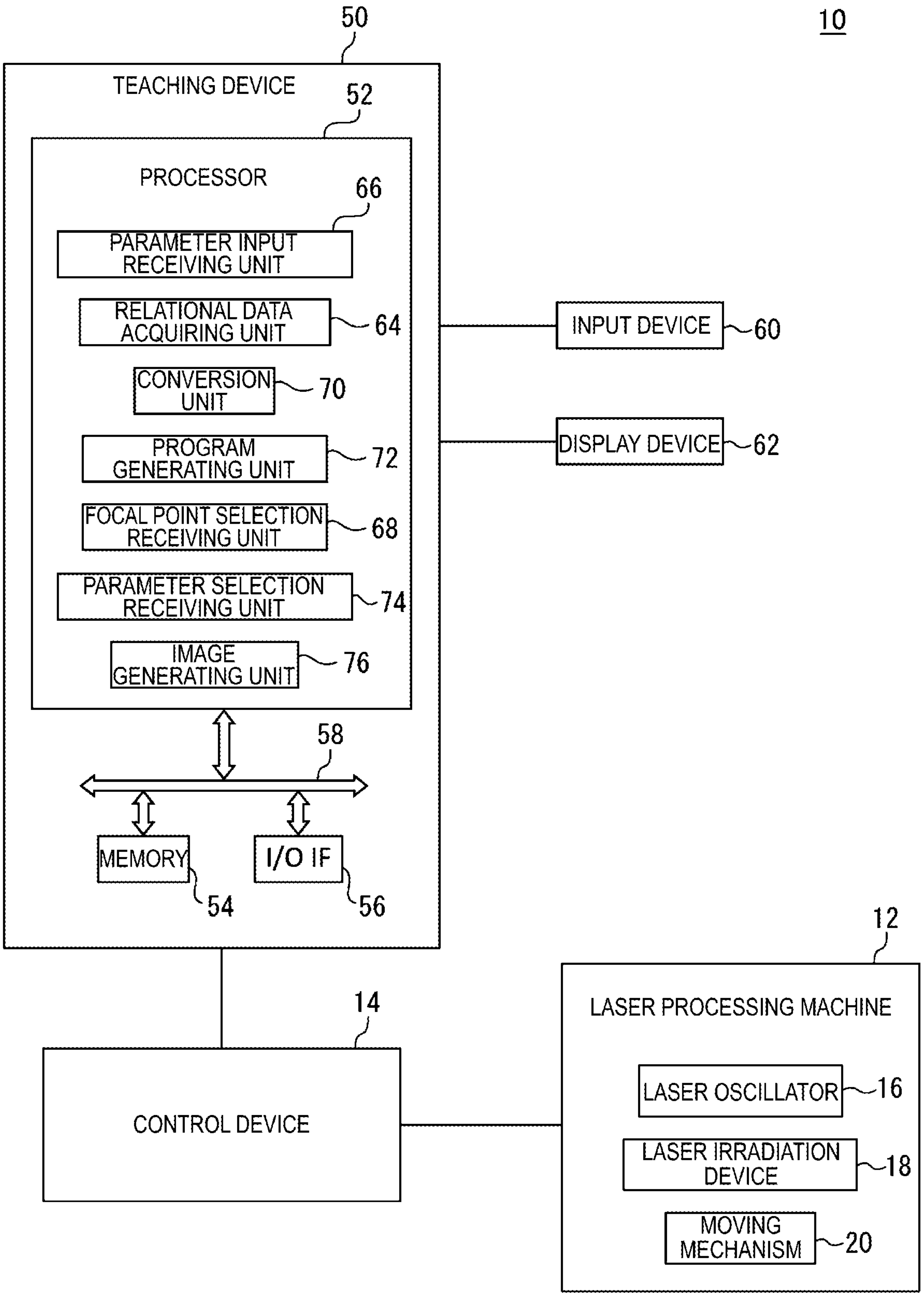
FIG. 8 is a diagram of a laser processing system according to another embodiment.

Next, other functions of the teaching device 50 will be described with reference to FIGS. 8 to 10. In the present embodiment, the plurality of data tables $DT_n$ described above are stored in advance in the memory 54 in association with the types TY (or identification information ID) of the laser processing machine 12. Upon receiving a teaching start command from the operator through the input device 60, the processor 52 generates a teaching image 120 illustrated in FIG. 9 as CG image data and displays the teaching image 120 on the display device 62.

The teaching image 120 includes a parameter selection image 122 and a type selection image 124 in addition to the data set input image 102, the focal point selection image 104, and the data set display image 106 described above. The parameter selection image 122 is for making it possible to select whether to input a beam size BS or a defocus amount DF as a parameter of the laser processing conditions LC.

By operating the input device 60 to click the "beam size" or "defocus amount" item displayed in the parameter selection image 122, the operator can select one of the two. The processor 52 receives an input for selecting the beam size BS or the defocus amount DF through the input device 60.

Thus, in the present embodiment, the processor 52 functions as a parameter selection receiving unit 74 (FIG. 8) that receives an input for selecting the beam size BS or the defocus amount DF. FIG. 9 illustrates the teaching image 120 when the beam size BS is selected as a parameter to be input.

The type selection image 124 is for selecting the type TY (or identification information ID) of the laser processing machine 12. Specifically, when the operator operates the input device 60 to click the type selection image 124 in the image, the types TY (e.g., type A, type B, type C, . . . ) of the laser processing machine 12 are displayed in the type selection image 124, for example, in the form of a pull-down list.

The operator can select a type TY shown in the form of a list in the type selection image 124 in the image. Upon receiving an input for selecting the type TY through the input device 60, the processor 52 functions as the relational data acquiring unit 64 and reads and acquires a data table $DT_n$ corresponding to the received type TY from the memory 54.

Figure 9:
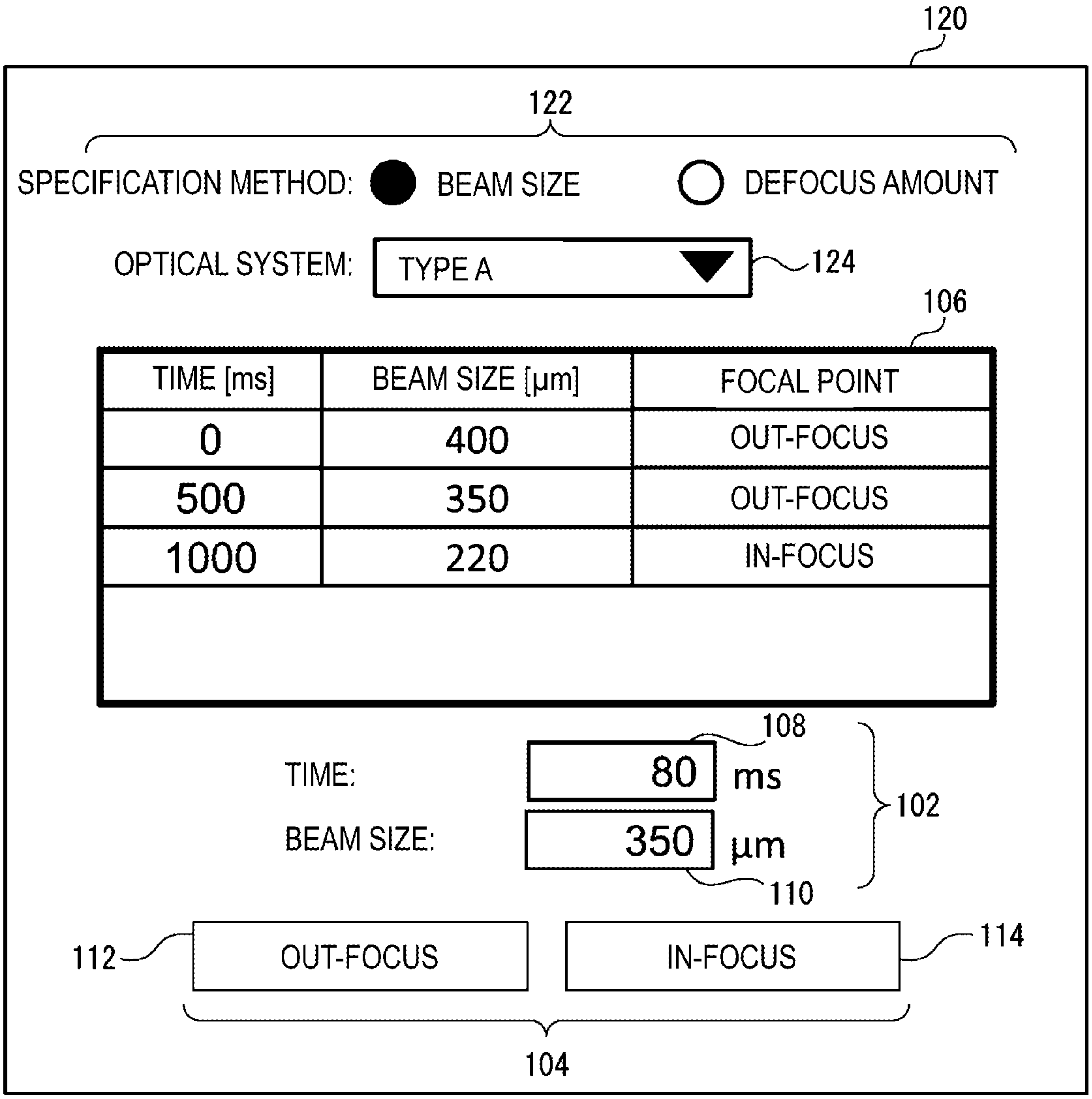
FIG. 9 illustrates another example of a teaching image.

For example, it is assumed that the processor 52 receives an input for selecting "beam size" in the parameter selection image 122 and receives an input for selecting "type A" in the type selection image 124 as illustrated in FIG. 9. In this case, the processor 52 functions as the relational data acquiring unit 64 and acquires a data table $DT_1$ corresponding to the type A from the memory 54.

Then, the processor 52 functions as the parameter input receiving unit 66 and receives an input of a data set DS1 of a progress parameter PP (an elapsed time $t_e$) and a beam size BS as a laser processing condition LC through the data set input image 102 and the focal point selection image 104 displayed in the teaching image 120. In this way, the processor 52 (the parameter input receiving unit 66) can receive an input of the beam size BS upon receiving an input for selecting the beam size BS in the parameter selection image 122 as illustrated in FIG. 9.

After that, upon receiving an operation program generation command, the processor 52 functions as the conversion unit 70 and converts a beam size BS registered in the laser processing conditions LC into a defocus amount DF using the acquired data table $DT_1$ as the relational data RD, as in the above embodiment, and functions as the program generating unit 72 and generates an operation program OP in which the position $P_{IP}$ and the defocus amount DF are defined as a command statement CM.

Figure 10:
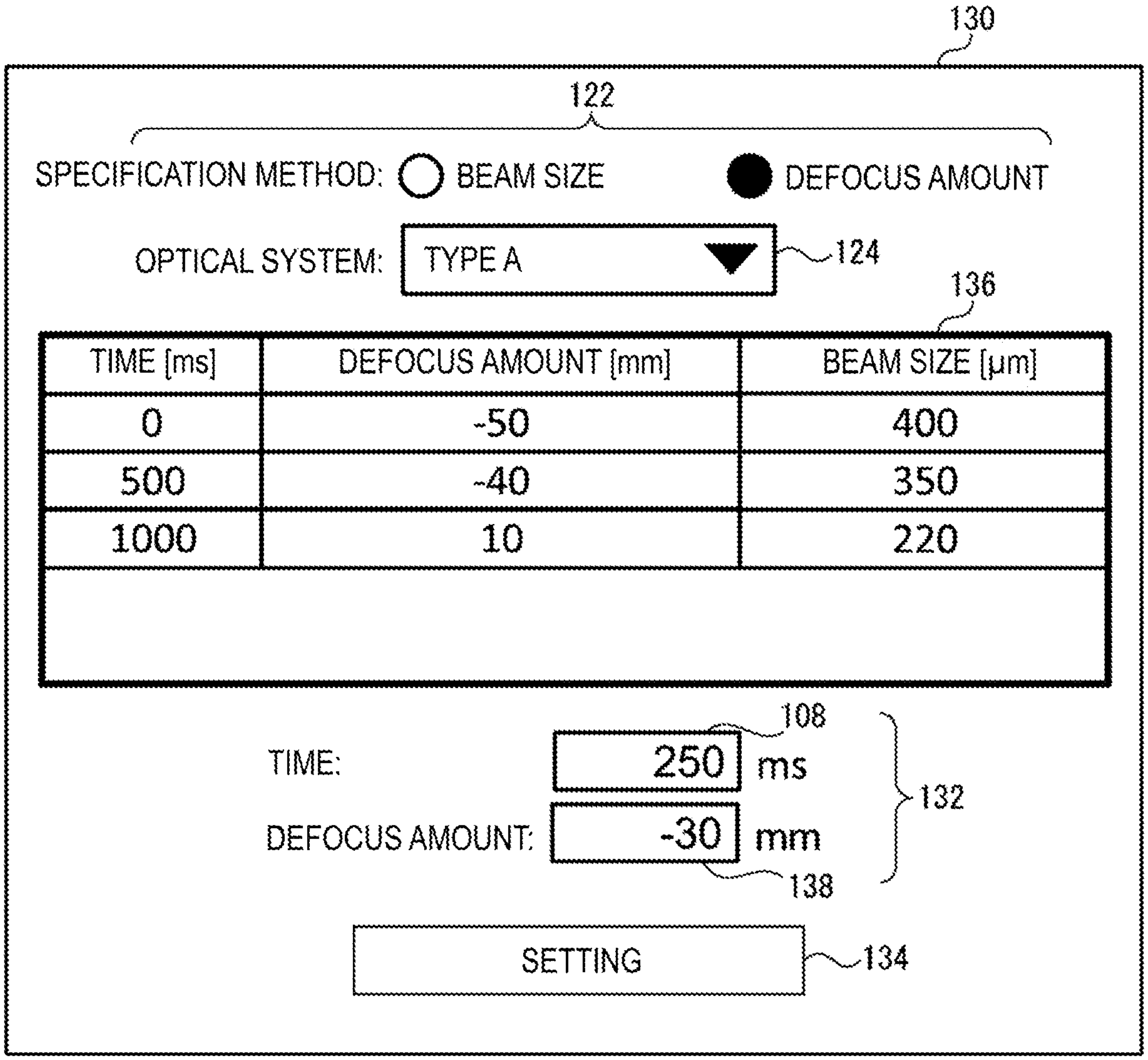
FIG. 10 illustrates still another example of a teaching image.

On the other hand, when the operator clicks the "defocus amount" item displayed in the parameter selection image 122, the processor 52 generates a teaching image 130 illustrated in FIG. 10. The teaching image 130 includes a data set input image 132, a setting button image 134, and a data set display image 136 in addition to the parameter selection image 122 and the type selection image 124 described above.

The data set input image 132 is for inputting a data set DS2 of a progress parameter PP (specifically, an elapsed time $t_e$) and a defocus amount DF and includes the progress parameter input image 108 described above and a defocus input image 138 into which a defocus amount (in mm) can be input.

The operator can operate the input device 60 to input the progress parameter PP (the elapsed time $t_e$) and the defocus amount DF to the progress parameter input image 108 and the defocus input image 138, respectively. In this way, the processor 52 (the parameter input receiving unit 66) can receive an input of the defocus amount DF upon receiving an input for selecting the defocus amount DF in the parameter selection image 122 as illustrated in FIG. 10.

The setting button image 134 is for registering the data set DS2 (the elapsed time $t_e$ and the defocus amount DF) input to the data set input image 132 in the laser processing conditions LC. Upon receiving an input for clicking the setting button image 134 in the image through the input device 60, the processor 52 stores the data set DS2 of the progress parameter PP (the elapsed time $t_e$) input to the progress parameter input image 108 and the defocus amount DF input to the defocus input image 138 in the memory 54 as a laser processing condition LC.

Along with this, the processor 52 functions as the conversion unit 70 and converts the defocus amount DF input to the defocus input image 138 into a beam size BS using the data table $DT_1$ acquired in response to the type TY ("type A" in the illustrated example) input to the type selection image 124 as the relational data RD.

Then, the processor 52 displays the data sets DS2 of progress parameters PP and defocus amounts DF registered in the laser processing conditions LC in the data set display image 136 together with the converted beam sizes BS. Thus, the corresponding beam sizes BS are displayed in the data set display image 136 together with the registered data set DS2 of progress parameters PP and defocus amounts DF as illustrated in FIG. 10.

That is, in the present embodiment, the processor 52 functions as an image generating unit 76 (FIG. 8) that generates image data (image data of the teaching image 130) that displays the converted beam size BS. After that, upon receiving an operation program generation command, the processor 52 functions as the program generating unit 72 and generates an operation program OP in which the defocus amount DF and the position $P_{IP}$ registered in the laser processing conditions LC are defined as a command statement CM.

In the present embodiment, the parameter selection receiving unit 74 receives an input for selecting the beam size BS or the defocus amount DF and the parameter input receiving unit 66 can receive an input of the beam size BS when an input for selecting the beam size BS is received (FIG. 9) and on the other hand can receive an input of the defocus amount DF when an input for selecting the defocus amount DF is received (FIG. 10) as described above.

Then, upon receiving an input of the defocus amount DF, the program generating unit 72 generates an operation program OP in which the defocus amount DF is defined as a command statement CM. According to this configuration, the operator can arbitrarily select which one of the beam size BS and the defocus amount DF to input as a laser processing condition LC, such that it is possible to teach the operation of the laser processing machine 12 more diversely.

In the present embodiment, the conversion unit 70 converts the received defocus amount DF into a corresponding beam size BS based on the relational data RD, and the image generating unit 76 generates image data (FIG. 10) that displays the converted beam size BS. According to this configuration, the operator can intuitively check the beam size BS corresponding to the input defocus amount DF.

In the above embodiments, the processor 52 may be configured to receive an input of the distance d described above as a progress parameter PP through the progress parameter input image 108. The processor 52 can acquire a corresponding position $P_{IP}$ from this distance d. The defocus amount DF may also be represented by a z-coordinate value of the coordinate system C.

Alternatively, the processor 52 may receive an input of a data set DS3 of the coordinates (x, y) of the coordinate system C of the position $P_{IP}$ of the irradiation point IP during laser processing and the beam size BS (or the defocus amount DF) as a laser processing condition LC instead of the data set DS1 (or DS2) of the progress parameter PP and the beam size BS (or the defocus amount DF).

The above embodiments have been described with respect to the case where the control device 14 displaces the focal point FP in the direction of the optical axis O by displacing the optical lens 36 in the direction of the optical axis O by the lens driving device 38. However, without being limited to this, the control device 14 can also shift the focal point FP, for example, by moving the laser irradiation device 18 in the z axis direction of the coordinate system C by operating the moving mechanism 20.

In this case, a command statement CM for shifting the focal point FP by the defocus amount DF by operating the moving mechanism 20 is determined in the operation program OP generated by the program generating unit 72. In laser processing, the control device 14 generates a command to the servo motor of the moving mechanism 20 (e.g., an articulated robot) in accordance with the command statement CM.

The above embodiments have also been described with respect to the case where the processor 52 acquires the data table DT as the relational data RD. However, rather than acquiring the data table DT, the processor 52 may acquire a function BS=f(DF) representing the relationship between the beam size BS (e.g., the diameter R) and the defocus amount DF as the relational data RD. This function BS=f (DF) can be predetermined from the specifications of the optical system of the laser processing machine 12 or the like.

The GUIs of the teaching images 100, 120, and 130 illustrated in FIG. 7, FIG. 9, and FIG. 10 are examples and any other GUI configuration may be employed. For example, the parameter selection image 122 may be omitted in the teaching image 120 illustrated in FIG. 9, while the defocus input image 138 and the setting button image 134 illustrated in FIG. 10 are added thereto.

In this case, the processor 52 can receive an input of a data set DS1 of the progress parameter PP and the beam size BS and an input of a data set DS2 of the progress parameter PP and the defocus amount DF through one teaching image 120. In this case, a corresponding defocus amount DF may be displayed in the data set display image 106 of the teaching image 120, similar to the data set display image 136 of FIG. 10.

The teaching device 50 can also be configured such that the operator can operate the input device 60 to select a registered data set DS1 (or DS2) in the data set display image 106 (or 136) and change (or delete) the beam size BS (or the defocus amount DF) of the selected data set DS1 (or DS2).

The above embodiments have also been described with respect to the case where the teaching device 50 is provided separately from the control device 14. However, the functionality of the teaching device 50 can also be incorporated into the control device 14. In this case, the processor of the control device 14 functions as the teaching device 50 (the relational data acquiring unit 64, the parameter input receiving unit 66, the focal point selection receiving unit 68, the conversion unit 70, the program generating unit 72, the parameter selection receiving unit 74, and the image generating unit 76).

Although FIG. 3 illustrates the laser irradiation device 18 as a laser scanner, the laser irradiation device 18 is not limited to a laser scanner and may be a laser processing head that includes only the housing 24, the light receiving part 26, the optical lens 36, the lens driving device 38, and the laser beam emitting part 40. The moving mechanism 20 may also be configured to move the workpiece W with respect to the laser irradiation device 18. The present disclosure has been described above through embodiments, but the above embodiments do not limit the invention according to the claims.

REFERENCE SIGNS LIST

10: LASER PROCESSING SYSTEM
12: LASER PROCESSING MACHINE
14: CONTROL DEVICE
16: LASER OSCILLATOR
18: LASER IRRADIATION DEVICE
20: MOVING MECHANISM
50: TEACHING DEVICE
52: PROCESSOR
64: RELATIONAL DATA ACQUIRING UNIT
66: PARAMETER INPUT RECEIVING UNIT
68: FOCAL POINT SELECTION RECEIVING UNIT
70: CONVERSION UNIT
72: PROGRAM GENERATING UNIT
74: PARAMETER SELECTION RECEIVING UNIT
76: IMAGE GENERATING UNIT

The invention claimed is:

1. A teaching device configured to teach an operation of a laser processing machine that irradiates a surface of a workpiece with a laser beam to perform laser processing on the workpiece, the teaching device comprising:

a parameter input receiving unit configured to receive an input of a beam size representing a size of an irradiation point of the laser beam on the surface;

a relational data acquiring unit configured to acquire relational data representing a relationship between a defocus amount, by which a focal point of the laser beam is to be shifted from the surface in an optical axis direction of the laser beam, and the beam size that changes in response to the defocus amount, the relational data including a data table in which a plurality of beam sizes and a plurality of corresponding defocus amounts are stored;

a conversion unit configured to convert the beam size received by the parameter input receiving unit into the corresponding defocus amount, based on the relational data, the conversion unit configured to, when the received beam size is not stored in the data table, acquire the defocus amount corresponding to the received beam size, using:

two of the plurality of beam sizes stored in the data table, that are closest to the received beam size;

two of the plurality of defocus amounts stored in the data table, that correspond to the two of the plurality of beam sizes; and an equation for linear interpolation between the two of the plurality of defocus amounts; and a program generating unit configured to generate an operation program for the laser processing, in which the converted defocus amount obtained by the conversion unit is defined as a command statement.

2. The teaching device of claim 1, further comprising a focal point selection receiving unit configured to receive an input for selecting out-focus, in which the focal point is shifted from the surface toward a laser beam emitting part of the laser processing machine, or in-focus, in which the focal point is shifted from the surface away from the laser beam emitting part, wherein the relational data includes data representing the relationship between the beam size and the defocus amount of the out-focus and the in-focus, and wherein the conversion unit is configured to convert the beam size received by the parameter input receiving unit into the defocus amount of the out-focus or the in-focus received by the focal point selection receiving unit.

3. A teaching device configured to teach an operation of a laser processing machine that irradiates a surface of a workpiece with a laser beam to perform laser processing on the workpiece, the teaching device comprising:

a parameter input receiving unit configured to receive an input of a beam size representing a size of an irradiation point of the laser beam on the surface;

a relational data acquiring unit configured to acquire relational data representing a relationship between a defocus amount, by which a focal point of the laser beam is to be shifted from the surface in an optical axis direction of the laser beam, and the beam size that changes in response to the defocus amount;

a conversion unit configured to convert the beam size received by the parameter input receiving unit into the corresponding defocus amount, based on the relational data;

a program generating unit configured to generate an operation program for the laser processing, in which the converted defocus amount obtained by the conversion unit is defined as a command statement; and:

a parameter selection receiving unit configured to receive an input for selecting the beam size or the defocus amount, wherein the parameter input receiving unit is capable of receiving the input of the beam size when the parameter selection receiving unit receives the input for selecting the beam size, while being capable of receiving an input of the defocus amount when the parameter selection receiving unit receives the input for selecting the defocus amount, and wherein, when the parameter input receiving unit receives the input of the defocus amount, the program generating unit is configured to generate the operation program in which the received defocus amount is defined as the command statement.

4. The teaching device of claim 3, wherein the conversion unit is configured to convert the defocus amount received by the parameter input receiving unit into the corresponding beam size, based on the relational data, wherein the teaching device further comprises an image generating unit configured to generate image data representing the converted beam size obtained by the conversion unit.

5. A teaching device configured to teach an operation of a laser processing machine that irradiates a surface of a workpiece with a laser beam to perform laser processing on the workpiece, the teaching device comprising:

a parameter input receiving unit configured to receive an input of a beam size representing a size of an irradiation point of the laser beam on the surface;

a relational data acquiring unit configured to acquire relational data representing a relationship between a defocus amount, by which a focal point of the laser beam is to be shifted from the surface in an optical axis direction of the laser beam, and the beam size that changes in response to the defocus amount;

a conversion unit configured to convert the beam size received by the parameter input receiving unit into the corresponding defocus amount, based on the relational data; and a program generating unit configured to generate an operation program for the laser processing, in which the converted defocus amount obtained by the conversion unit is defined as a command statement, wherein the laser processing machine is configured to move the irradiation point with respect to the surface in the laser processing, wherein the parameter input receiving unit is capable of receive an input of a data set of a progress parameter indicating progress of the laser processing and the beam size, and wherein the program generating unit is configured to generate the operation program including the command statement for shifting the focal point by the converted defocus amount when the irradiation point reaches a position on the surface corresponding to the progress parameter.

6. The teaching device of claim 5, wherein the progress parameter includes an elapsed time from start of the laser processing, or a distance by which the laser processing machine moves the irradiation point from start of the laser processing.

7. A laser processing system comprising:

the teaching device of claim 1;

the laser processing machine; and a control device configured to operate the laser processing machine in accordance with the operation program generated by the program generating unit to perform the laser processing.

8. A method of teaching an operation of a laser processing machine that irradiates a surface of a workpiece with a laser beam to perform laser processing on the workpiece, the method comprising:

receiving, by a processor, an input of a beam size representing a size of an irradiation point of the laser beam on the surface;

acquiring, by the processor, relational data representing a relationship between a defocus amount, by which a focal point of the laser beam is to be shifted from the surface in an optical axis direction of the laser beam, and the beam size that changes in response to the defocus amount, the relational data including a data table in which a plurality of beam sizes and a plurality of corresponding defocus amounts are stored;

when converting the received beam size into the corresponding defocus amount, based on the relational data in a case where the received beam size is not stored in the data table, acquiring, by the processor, the defocus amount corresponding to the received beam size, using:

two of the plurality of beam sizes stored in the data table, which are closest to the received beam size;

two of the plurality of defocus amounts stored in the data table, which correspond to the two of the plurality of beam sizes; and an equation for linear interpolation between the two of the plurality of defocus amounts; and generating, by the processor, an operation program for the laser processing in which the converted defocus amount is defined as a command statement.

9. The teaching device of claim 1, wherein the equation is $(R_n-R_x)/(R_x-R_n+1)=(|DF_n|-|DF_x|)/(|DF_x|-|DF_{n+1}|)$, where $R_x$ indicates a diameter of the laser beam received by the parameter input receiving unit as the beam size, $DF_x$ indicates a defocus amount corresponding to the diameter $R_x$, Rn indicates one of the diameters stored in the data table as the beam sizes, that is larger than and closest to the diameter Rx, $R_{n+1}$ indicates one of the diameters stored in the data table as the beam sizes, that is smaller than and closest to the diameter Rx $DF_n$ indicates a defocus amount corresponding to the diameter Rn and stored in the data table, and $DF_{n+1}$ indicates a defocus amount corresponding to the diameter $R_{n+1}$ and stored in the data table.

10. A method of teaching an operation of a laser processing machine that irradiates a surface of a workpiece with a laser beam to perform laser processing on the workpiece, the method comprising:

receiving, by a processor, an input of a beam size representing a size of an irradiation point of the laser beam on the surface;

acquiring, by the processor, relational data representing a relationship between a defocus amount, by which a focal point of the laser beam is to be shifted from the surface in an optical axis direction of the laser beam, and the beam size that changes in response to the defocus amount;

converting, by the processor, the received beam size into the corresponding defocus amount, based on the relational data;

generating, by the processor, an operation program for the laser processing in which the converted defocus amount is defined as a command statement;

receiving, by the processor, an input for selecting the beam size or the defocus amount, wherein the input of the beam size is capable of being received when receiving the input for selecting the beam size, while the defocus amount is capable of being received when receiving the input for selecting the defocus amount; and when receiving the input of the defocus amount, generating, by the processor, the operation program in which the received defocus amount is defined as the command statement.

11. A method of teaching an operation of a laser processing machine that irradiates a surface of a workpiece with a laser beam to perform laser processing on the workpiece, the method comprising:

receiving, by a processor, an input of a beam size representing a size of an irradiation point of the laser beam on the surface;

acquiring, by the processor, relational data representing a relationship between a defocus amount, by which a focal point of the laser beam is to be shifted from the surface in an optical axis direction of the laser beam, and the beam size that changes in response to the defocus amount;

converting, by the processor, the received beam size into the corresponding defocus amount, based on the relational data;

generating, by the processor, an operation program for the laser processing in which the converted defocus amount is defined as a command statement;

receiving, by the processor, an input of a data set of a progress parameter indicating progress of the laser processing and the beam size; and generating, by the processor, the operation program including the command statement for shifting the focal point by the converted defocus amount when the irradiation point reaches a position on the surface corresponding to the progress parameter.

* * * * *